(12) United States Patent
Laurent

(10) Patent No.: US 10,673,527 B2
(45) Date of Patent: Jun. 2, 2020

(54) SATELLITE TELECOMMUNICATIONS SYSTEM COMPRISING AN OPTICAL GATEWAY LINK AND A RADIO GATEWAY LINK, AND CONTROL METHOD

(71) Applicant: AIRBUS DEFENCE AND SPACE SAS, Toulouse (FR)

(72) Inventor: Bernard Laurent, Toulouse (FR)

(73) Assignee: AIRBUS DEFENCE AND SPACE SAS, Toulouse (FR)

( * ) Notice: Subject to any disclaimer, the term of this patent is extended or adjusted under 35 U.S.C. 154(b) by 0 days.

(21) Appl. No.: 16/465,679

(22) PCT Filed: Dec. 1, 2017

(86) PCT No.: PCT/EP2017/081228
§ 371 (c)(1),
(2) Date: May 31, 2019

(87) PCT Pub. No.: WO2018/100180
PCT Pub. Date: Jun. 7, 2018

(65) Prior Publication Data
US 2019/0305848 A1 Oct. 3, 2019

(30) Foreign Application Priority Data
Dec. 2, 2016 (FR) ..................................... 16 61846

(51) Int. Cl.
*H04B 10/118* (2013.01)
*H04B 7/185* (2006.01)
(Continued)

(52) U.S. Cl.
CPC ....... *H04B 10/118* (2013.01); *H04B 7/18513* (2013.01); *H04B 10/572* (2013.01); *H04B 10/90* (2013.01)

(58) Field of Classification Search
CPC .. H04B 10/112; H04B 10/1123; H04B 10/118
See application file for complete search history.

(56) References Cited

U.S. PATENT DOCUMENTS 7,925,167 B1 4/2011 Kozubal et al.
2009/0286467 A1* 11/2009 Miller ................ H04B 7/18543
455/3.02

(Continued)

FOREIGN PATENT DOCUMENTS

WO  WO 2009/051907  4/2009
WO  WO 2016/022579  2/2016

OTHER PUBLICATIONS

International Search Report, PCT/EP2017/081228, dated Feb. 19, 2018.

*Primary Examiner* — Shi K Li
(74) *Attorney, Agent, or Firm* — Young & Thompson

(57) ABSTRACT

Disclosed is a satellite telecommunications system including at least one satellite in terrestrial orbit, referred to as optical gateway satellite, having a payload, the payload including a communication module, referred to as user module, capable of exchanging data with at least one terrestrial user terminal, and further including a communication module, referred to as gateway module, capable of exchanging data in the form of optical signals with at least one terrestrial optical gateway station. Also disclosed is a method for controlling such a satellite telecommunications system.

12 Claims, 2 Drawing Sheets

Figure 1:
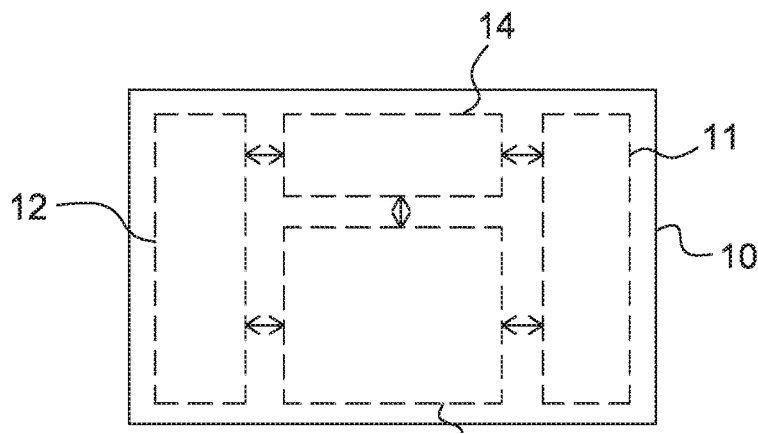

(51) Int. Cl.
*H04B 10/572* (2013.01)
*H04B 10/90* (2013.01)

(56) References Cited

U.S. PATENT DOCUMENTS

2016/0269116 A1   9/2016  Welle et al.
2017/0026122 A1*  1/2017  Everett ................ H04B 10/118
2019/0123813 A1*  4/2019  Mendelsohn ........ H04B 10/118

* cited by examiner

SATELLITE TELECOMMUNICATIONS SYSTEM COMPRISING AN OPTICAL GATEWAY LINK AND A RADIO GATEWAY LINK, AND CONTROL METHOD

TECHNICAL FIELD

The present invention applies to the field of satellite telecommunications systems, and relates to a satellite payload, a satellite telecommunications system comprising a satellite with such a payload, and a control method, as well as a method for increasing the capacity of a satellite telecommunications system.

PRIOR ART

In a conventional manner, a telecommunications satellite comprises a payload equipped with means suitable for exchanging data with one or more terrestrial gateway stations, and with one or more terrestrial user terminals. The term "terrestrial" must be understood herein to mean on the surface of the Earth, in particular on the ground, at the top of a building or pylon, etc., that is capable or incapable of moving (land, sea or air vehicle).

Each gateway station creates, for the satellite, an access point to a terrestrial core network. Thus, a gateway station that receives, from the core network, data intended for a user terminal, emits said data to the satellite, which retransmits said data to said user terminal. Similarly, the user terminal can emit data to the satellite, which retransmits said data to a gateway station, which in turn retransmits said data to the core network.

The data exchanges firstly between the satellite and the user terminals, and secondly between the satellite and the gateway stations, take place in the form of radio-frequency signals. The term "radio-frequency signal" must be understood herein as an electromagnetic wave, the frequencies whereof lie in the conventional spectrum of radio-frequency waves (several hertz to several hundred gigahertz).

There is a significant need today to increase the capacity of existing satellite telecommunications systems in order to provide so-called broadband services, and/or to feed more user terminals, etc.

However, the capacity of the existing satellite telecommunications systems is limited, in particular because the radio-frequency bands constitute a limited resource and the use whereof is subjected to administrative authorisation, which is uncertain and must be requested several years in advance. Moreover, the radio-frequency bands are subjected to high levels of interference, in particular generated by terrestrial telecommunications systems. Finally, the increase in the capacity of an existing satellite telecommunications system must preferably take place while ensuring compatibility with the existing user terminals.

DESCRIPTION OF THE INVENTION

A purpose of the present invention is to overcome all or part of the limitations of the solutions of the prior art, in particular those described hereinabove.

For this purpose, and according to a first aspect, the invention relates to a satellite payload of a satellite telecommunications system, said payload comprising a communication module, referred to as a user module, suitable for exchanging data with at least one terrestrial user terminal. Said payload comprises a communication module, referred to as a gateway module, suitable for exchanging data in the form of optical signals with at least one terrestrial optical gateway station.

Thus, the payload is configured such that it exchanges data with optical gateway stations in the form of optical signals. The terms "optical signal" must be understood herein to be an electromagnetic wave, the wavelengths whereof lie in the range 0.4 micrometres (μm) to 11 μm.

There are many advantages to using an optical link for the data exchanges between the payload of the satellite and the gateway stations. In particular, an optical link allows for very high data rates, and the use of optical frequency bands does not require requests for prior administrative authorisation.

Moreover, the use of optical frequency bands may concern only the data exchanges with the terrestrial gateway stations, over a gateway link (known as a feeder link) of the satellite. Data exchanges with the user terminals, over a user link of the satellite, can take place in the form of radio-frequency signals and, preferably, be compatible with the existing user terminals, which thus do not require modification or replacement.

According to specific embodiments, the payload can further comprise one or more of the following features, which must be considered singly or according to any combinations technically possible.

According to specific embodiments, the gateway module is furthermore suitable for exchanging data in the form of radio-frequency signals with at least one terrestrial radio gateway station.

More specifically, in the absence of any optical path between the satellite carrying the payload and the optical gateway station (for example due to the presence of clouds between the satellite and the optical gateway station), data cannot be exchanged with the optical gateway station in the form of optical signals. In such a case, the data exchanges can nonetheless take place in the form of radio-frequency signals to a radio gateway station, however with a reduced capacity compared to the possible capacity over the optical link.

According to specific embodiments, the user module is suitable for exchanging data in the form of radio-frequency signals with the user terminal.

According to specific embodiments, the user module is suitable for exchanging data in the form of optical signals with at least one terrestrial optical user terminal.

According to specific embodiments, the user module is a multibeam communication module, capable of implementing any known beam-forming method (using a single feed per beam or using a multiple feed per beam—with a fixed or variable beam-forming network or using an active antenna, etc.), including using a beam hopping method.

According to a second aspect, the invention relates to a satellite telecommunications system comprising at least one terrestrial user terminal, and at least one satellite orbiting the Earth, referred to as an optical gateway satellite, comprising a payload according to any of the embodiments of the invention. The user module of said payload is suitable for exchanging data with said user terminal, and the gateway module of said payload is suitable for exchanging data with at least one optical gateway station.

According to specific embodiments, the satellite telecommunications system can further comprise one or more of the following features, which must be considered singly or according to any combinations technically possible.

According to specific embodiments, the satellite telecommunications system comprises a control module configured such that it determines whether an optical path exists between the optical gateway satellite and an optical gateway station and, whereby the gateway module of the optical gateway satellite is suitable for exchanging data in the form of radio-frequency signals with a radio gateway station, such that it routes the data from the user terminal to a radio gateway station in the absence of any optical path.

According to specific embodiments, the optical gateway satellite is in low Earth orbit (LEO).

According to specific embodiments, the satellite telecommunications system comprises at least two remote optical gateway stations arranged such that they allow the simultaneous existence of optical paths between the optical gateway satellite and each of the two optical gateway stations. Such arrangements allow an optical link to be used more often. More specifically, even in the presence of clouds, said clouds may obstruct only one of the optical paths, such that the probability of having at least one unobstructed optical path is increased.

According to specific embodiments, the satellite telecommunications system comprises at least one so-called radiofrequency-only gateway satellite, comprising a communication module, referred to as a user module, suitable for exchanging data with said user terminal, and a communication module, referred to as a gateway module, suitable for exchanging data solely in the form of radio-frequency signals with at least one radio gateway station. Such embodiments in particular correspond to the case of an increase in the capacity of an existing satellite telecommunications system by adding a satellite comprising a payload according to any of the embodiments of the invention.

According to specific embodiments, the satellite telecommunications system comprises a control module configured such that it determines whether an optical path exists between the optical gateway satellite and an optical gateway station and such that it routes the data from the user terminal to the radiofrequency-only gateway satellite in the absence of any optical path.

According to specific embodiments, the satellite telecommunications system comprises a plurality of user terminals suitable for exchanging data with the radiofrequency-only gateway satellite and with the optical gateway satellite, and a control module configured such that it distributes the user terminals between the radiofrequency-only gateway satellite and the optical gateway satellite in the case whereby an optical path exists between the optical gateway satellite and an optical gateway station.

Thus, if an optical path exists between the optical gateway satellite and an optical gateway station, the user terminals can be fed by two different satellites, one being a radiofrequency-only gateway satellite and the other being an optical gateway satellite. Said user terminals can thus be distributed between the radiofrequency-only gateway satellite and the optical gateway satellite, by implementing resource-allocation techniques, and by taking into account the highest capacity of the optical link between the optical gateway satellite and the optical gateway station.

According to specific embodiments, the control module is configured such that it distributes said user terminals between the radiofrequency-only gateway satellite and the optical gateway satellite as a function of at least one parameter from the following group of parameters:
the data rate required for each user terminal,
the quality of service level required for each user terminal,
the type of application used by each user terminal,
the number of user terminals to be fed per beam, etc.

According to specific embodiments, the control module is configured such that it controls the data rate from each user terminal as a function of the existence or absence of an optical path between the optical gateway satellite and the optical gateway station.

According to a third aspect, the invention relates to a method for controlling a satellite telecommunications system comprising at least one radiofrequency-only gateway satellite and at least one optical gateway satellite. With a plurality of user terminals being suitable for exchanging data with the radiofrequency-only gateway satellite and with the optical gateway satellite, the control method comprises the steps of:
determining whether an optical path exists between the optical gateway satellite and a terrestrial optical gateway station,
if no optical path exists therebetween: routing the data from the user terminals to the radiofrequency-only gateway satellite,
if an optical path exists: distributing the user terminals between the radiofrequency-only gateway satellite and the optical gateway satellite.

According to specific embodiments, the control method can further comprise one or more of the following features, which must be considered singly or according to any combinations technically possible.

According to specific embodiments, the distribution of the user terminals between the radiofrequency-only gateway satellite and the optical gateway satellite is determined as a function of at least one parameter from the following group of parameters:
the data rate required for each user terminal,
the quality of service level required for each user terminal,
the type of application used by each user terminal,
the number of user terminals to be fed per beam, etc.

According to specific embodiments, the control method comprises the step of controlling a data rate from each user terminal as a function of the existence or absence of an optical path between the optical gateway satellite and an optical gateway station.

According to a fourth aspect, the invention relates to a computer program product comprising a set of program code instructions which, when executed by a processor, configure said processor to implement a control method according to any of the embodiments of the invention.

According to a fifth aspect, the invention relates to a method for increasing the capacity of a satellite telecommunications system comprising at least one terrestrial user terminal and at least one satellite orbiting the Earth, referred to as a radiofrequency-only gateway satellite, comprising a communication module, referred to as a user module, suitable for exchanging data with said user terminal, and a communication module, referred to as a gateway module, suitable for exchanging data solely in the form of radio-frequency signals with at least one radio gateway station. The method for increasing the capacity comprises stationing at least one so-called optical gateway satellite in Earth orbit, comprising a communication module, referred to as a user module, suitable for exchanging data with said user terminal, and a communication module, referred to as a gateway module, suitable for exchanging data in the form of optical signals with at least one terrestrial optical gateway station.

According to specific embodiments, the method for increasing the capacity can further comprise one or more of the following features, which must be considered singly or according to any combinations technically possible.

According to specific embodiments, the method for increasing the capacity comprises the gradual deployment of optical gateway stations.

According to specific embodiments, the method for increasing the capacity further comprises, after the stationing of the optical gateway satellite, controlling the satellite telecommunications system in accordance with a control method according to any of the implementations of the invention.

PRESENTATION OF THE FIGURES

Figure 2:
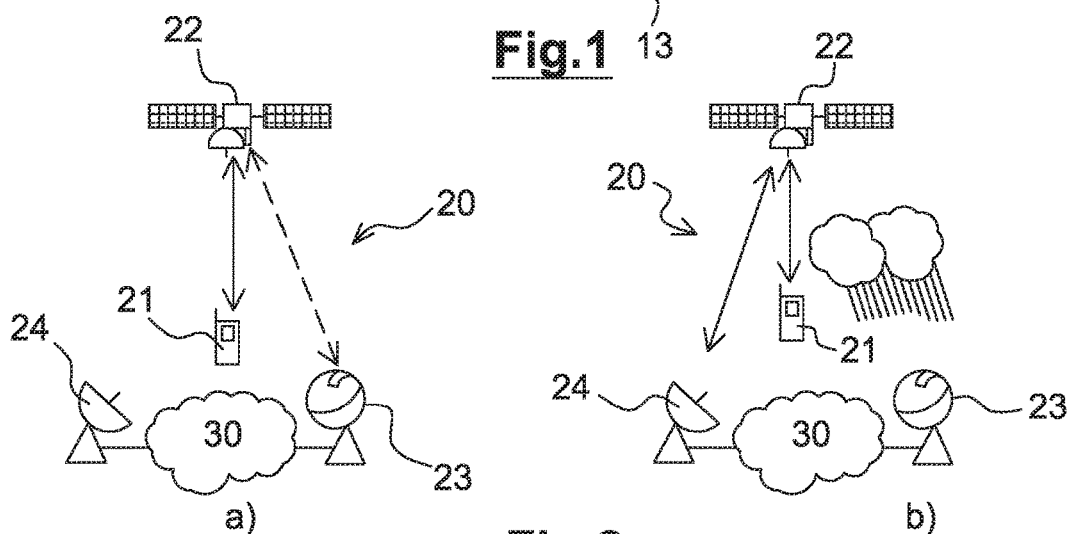
Figure 3:
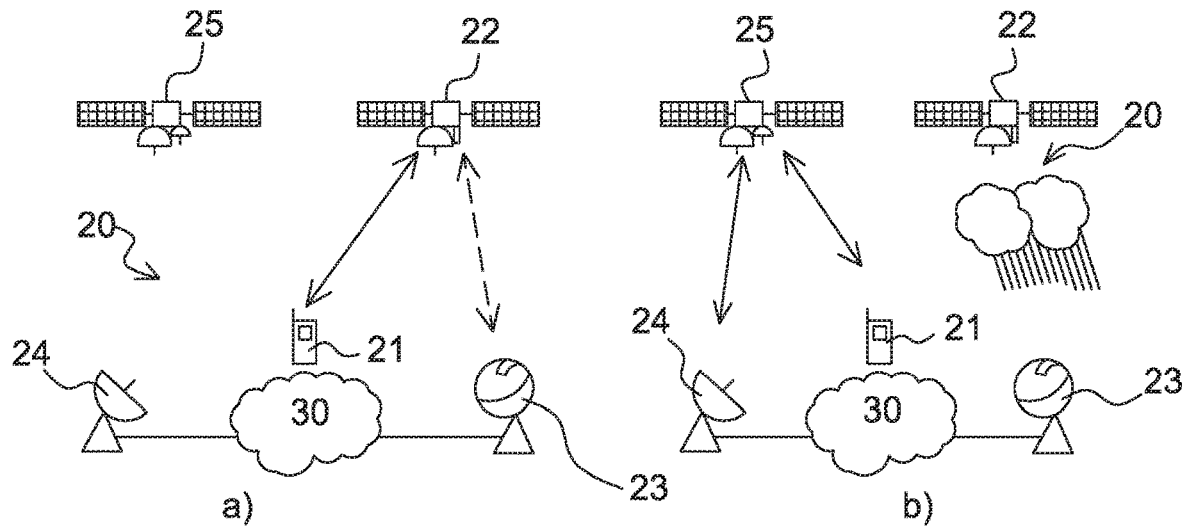
Figure 4:
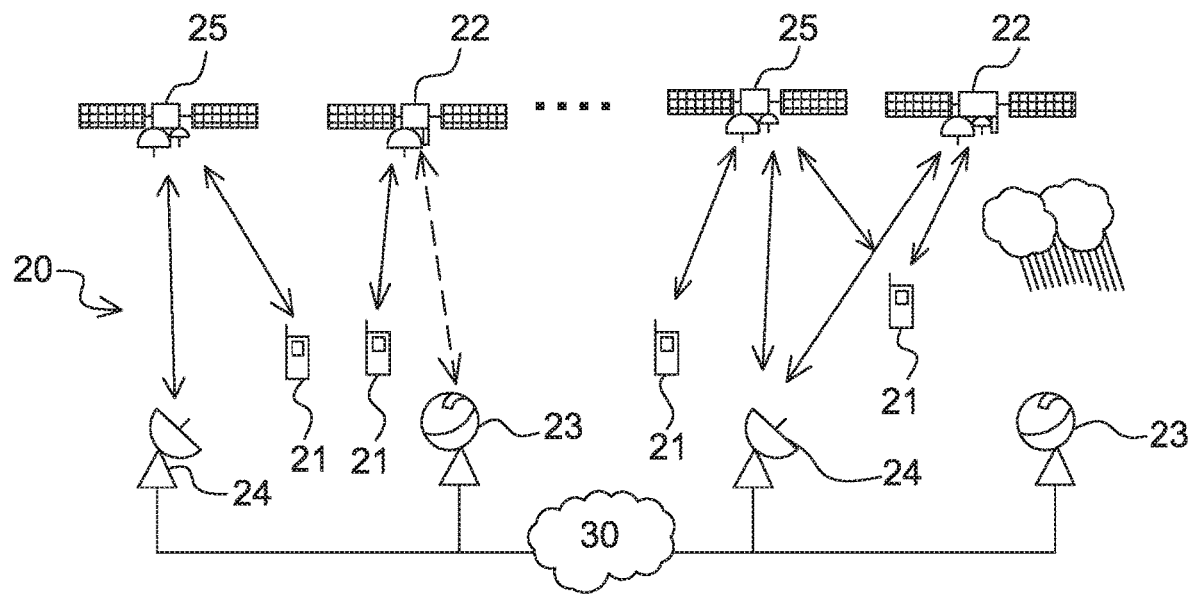
Figure 5:
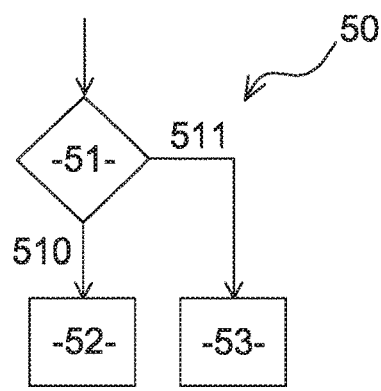

The invention will be better understood after reading the following description, intended for purposes of illustration only and not intended to limit the scope of the invention, with reference to the following figures which represent:

FIG. 1: a diagrammatic view of an optical gateway satellite payload,

FIG. 2: a diagrammatic view of one example embodiment of a satellite telecommunications system, FIG. 3: a diagrammatic view of an alternative embodiment of the satellite telecommunications system shown in FIG. 2, FIG. 4: a diagrammatic view of one preferred embodiment of a satellite telecommunications system, FIG. 5: a diagram showing the main steps of a method for controlling a satellite telecommunications system.

In these figures, identical reference numerals in one or another figure denote identical or similar elements. For clarity purposes, the elements shown are not to scale, unless specified otherwise.

DETAILED DESCRIPTION OF THE EMBODIMENTS

FIG. 1 diagrammatically illustrates one example embodiment of a payload 10 for a so-called optical gateway satellite 22 intended to be placed in Earth orbit.

As shown in FIG. 1, the payload 10 comprises a communication module, referred to as a user module 11, suitable for exchanging data over a user link with terrestrial user terminals 21. The payload 10 further comprises a communication module, referred to as a gateway module 12, suitable for exchanging data over a feeder link in the form of optical signals with at least one terrestrial optical gateway station 23.

As stated hereinabove, the optical gateway station 23 creates, for the optical gateway satellite 22, an access point to a terrestrial core network 30. Thus, an optical gateway station 23 that receives, from the core network 30, data intended for a user terminal 21, emits said data to the gateway module 12 of the optical gateway satellite 22, which retransmits said data via the user module 11 to said user terminal 21. Similarly, the user terminal can emit data to the user module 11 of the optical gateway satellite 22, which retransmits said data via the gateway module 12 to an optical gateway station 23, which in turn retransmits said data to the core network 30.

The payload 10 further comprises other equipment such as, for example, a demultiplexing/multiplexing module 13, which creates the interface between the user module 11 and the gateway module 12, as well as an actuation module 14 for actuating the demultiplexing/multiplexing module 13. The actuation module 14 and the demultiplexing/multiplexing module 13 are not included within the scope of the invention, and can take any suitable form.

The gateway module 12 comprises, for example, an optical circuit suitable for exchanging data in the form of optical signals. The data exchanged in the form of optical signals by said gateway module 12 preferably comprises both payload data and control data. It should be noted that the gateway module 12 can comprise a plurality of optical circuits allowing for the simultaneous creation of a plurality of optical links with respectively different optical gateway stations 23.

According to specific embodiments, the gateway module 12 is furthermore suitable for exchanging data in the form of radio-frequency signals with at least one radio gateway station 24. For this purpose, the gateway module 12 comprises, for example, one or more radio circuits suitable for exchanging data in the form of radio-frequency signals, for example in one or more radio-frequency bands from the group consisting of Q-, V-, Ka-, Ku-, and L-bands, etc.

In other words, in such embodiments, the gateway module 12 is hybrid in that it can exchange data over the feeder link both in the form of optical signals and in the form of radio-frequency signals. Such arrangements are advantageous in that an optical link cannot always be established between the optical gateway satellite 22 and an optical gateway station 23. In particular, in the case whereby clouds are present between the optical gateway satellite 22 and the optical gateway station 23, there is no optical path that allows an optical link to be established over the feeder link. In such a case, the gateway module 12 of the optical gateway satellite 22 can establish a radio link with a radio gateway station 24. More specifically, a radio link is less sensitive to meteorological interference than an optical link, and is thus available more often than an optical link. Such a solution thus allows, over the feeder link, for a greater availability of the radio link and a higher capacity of the optical link, when said optical link is available.

The user module 11 comprises, for example, one or more radio circuits suitable for exchanging data in the form of radio-frequency signals, for example in one or more radio-frequency bands from the group consisting of Q-, V-, Ka-, Ku-, and L-bands, etc. The data exchanged by the user module 11 preferably comprises both payload data and control data.

Preferably, the user module 11 is a multibeam communication module, i.e. it is suitable for forming, over the user link, a plurality of beams feeding different geographical areas on the Earth's surface. As a whole, any known beam-forming method (using a single feed per beam or using a multiple feed per beam—with a fixed or variable beam-forming network or using an active antenna, etc.) can be implemented over the user link, including using a beam hopping method.

The use of a multibeam user module 11 is particularly advantageous in that it allows the increase in capacity procured by the optical link to be optimally used over the feeder link. More specifically, the use of beams allows the same radio-frequency bands to be reused from one beam to another. Thus, denoting the number of beams as $N_F$ and the maximum data rate in each beam as $D_{MAX}$, the maximum data rate over the user link can be equal to $N_F \cdot D_{MAX}$. In conventional satellite telecommunications systems, the maximum data rate $D_{MAX}$ cannot be used in each beam since, given that the link over the feeder link is a radio link, the maximum data rate over the user link is generally too high for the feeder link. This is no longer the case with an optical link over the feeder link such that, when said optical link is available, the maximum data rate can be used in each beam.

Alternatively or additionally, the user module 11 comprises one or more optical circuits and is suitable for exchanging data in the form of optical signals with at least one optical user terminal. Such arrangements procure such an optical user terminal (which can be a hybrid user terminal, i.e. both optical and radio) a higher maximum data rate when the optical link is available both between the user module 11 and the optical user terminal, and between the gateway module 12 and the optical gateway station 23.

FIG. 2 diagrammatically illustrates one example embodiment of a satellite telecommunications system 20 comprising an optical gateway satellite 22 comprising a payload 10 as described with reference to FIG. 1, and considers the case wherein the gateway module 12 is hybrid (both optical and radio). In the example shown in FIG. 2, the satellite telecommunications system 20 further comprises:
- a user terminal 21,
- a radio gateway station 24,
- an optical gateway station 23.

The radio gateway station 24 and the optical gateway station 23 are connected to a core network 30. In the example shown in FIG. 2, the optical gateway station 23 and the radio gateway station 24 are separate. However, this does not prevent, according to other examples, one and the same hybrid, optical and radio gateway station from being used.

Conventional broadband satellite telecommunications systems generally comprise a plurality of radio gateway stations 24. In a satellite telecommunications system 20 according to the invention, a plurality of optical gateway stations 23 can be deployed. In order to reduce the number (and operating costs) of the sites to be deployed for an operator, the one or more optical gateway stations 23 are preferably deployed on the same sites as those used for the radio gateway stations 24, for example on sites providing the best availability of the optical link.

The optical gateway satellite 22 is, for example, in geostationary orbit (GEO) or in low Earth orbit (LEO), or in medium Earth orbit (MEO), etc.

In part a) of FIG. 2, an optical path exists between the optical gateway satellite 22 and the optical gateway station 23, such that an optical link can be established. In such a case, the data exchanges over the feeder link preferably take place with the optical gateway station 23 in the form of optical signals (shown by a dotted line in FIG. 2) in order to benefit from greater capacity. The data exchanges over the user link with the user terminal 21 take place, for example, in the form of radio-frequency signals (shown by a solid line in FIG. 2), for example in the Ka-band or Q/V-band, etc. In the event that an optical path exists, it is also possible to use both the feeder link with the optical gateway station 23 and the feeder link with the radio gateway station 24. In particular, when a plurality of user terminals 21 are exchanging data with the optical gateway satellite 22, the data from the user terminals 21 can be distributed between the feeder link with the optical gateway station 23 and the feeder link with the radio gateway station 24.

In part b) of FIG. 2, no optical path exists between the optical gateway satellite 22 and the optical gateway station 23, due to the presence of clouds, such that no optical link can be established over the feeder link. In such a case, the data exchanges over the feeder link take place with the radio gateway station 24 in the form of radio-frequency signals.

FIG. 3 diagrammatically illustrates an alternative embodiment of the satellite telecommunications system 20 shown in FIG. 2, wherein the gateway module of the optical gateway satellite 22 is exclusively optical.

With reference to the example shown in FIG. 2, the satellite telecommunications system 20 further comprises a so-called radiofrequency-only gateway satellite 25 orbiting the Earth. The radiofrequency-only gateway satellite 25 comprises a communication module, referred to as a user module (not shown in the figures), suitable for exchanging data with the user terminal 21. Preferably, the user module of the radiofrequency-only gateway satellite 25 is a multi-beam communication module. The radiofrequency-only gateway satellite 25 further comprises a communication module, referred to as a gateway module (not shown in the figures), suitable for exchanging data solely in the form of radio-frequency signals over the feeder link with the radio gateway station 24.

The example shown in FIG. 3 in particular corresponds to the case of an increase in the capacity of an existing conventional satellite telecommunications system by the addition of an optical gateway satellite 22 and an optical gateway station 23.

In preferred embodiments, the user module of the radiofrequency-only gateway satellite 25 and the user module 11 of the optical gateway satellite 22, which potentially feed different beams, both operate in the same radio-frequency band such as, for example, the Ka-band or the Q/V-band, etc. Such a solution is advantageous, in particular in the case of an increase in the capacity of an existing satellite telecommunications system, since it is compatible with the existing user terminals, which thus do not require modification or replacement, however provided that they are equipped with pointing means allowing them to be pointed either towards the radiofrequency-only gateway satellite 25 or towards the optical gateway satellite 22. However, in an existing satellite telecommunications system comprising satellites in moving orbit (for example in LEO), the user terminals are constantly passing from one satellite to another in order to exchange data. To do this, such user terminals thus already have pointing means (which are mechanical and/or electronic in the case of a network antenna) for passing from one satellite to another.

However, this does not prevent, according to other examples, the use of different radio-frequency bands over the user link of the radiofrequency-only gateway satellite 25 (for example the Ka-band) and over the user link of the optical gateway satellite 22 (for example the Q/V-band). However, such a solution may not be compatible with the existing user terminals, such that the increase in capacity may only benefit certain user terminals capable of operating in different radiofrequency bands. However, the use of different radio-frequency bands simplifies the management of interference between the two types of user links during the increase in capacity, since said two types of user links would be spaced sufficiently apart from one another in the frequency domain.

In part a) of FIG. 3, an optical path exists between the optical gateway satellite 22 and the optical gateway station 23, such that an optical link can be established. In such a case, the user terminal 21 preferably exchanges data with the optical gateway satellite 22, and the data exchanges over the feeder link take place with the optical gateway station 23 (shown by a dotted line in FIG. 3).

In part b) of FIG. 3, no optical path exists between the optical gateway satellite 22 and the optical gateway station 23, due to the presence of clouds, such that no optical link can be established over the feeder link. In such a case, the user terminal 21 exchanges data with the radiofrequency-only gateway satellite 25, and the data exchanges over the feeder link take place with the radio gateway station 24 (shown by a solid line in FIG. 3).

This does not prevent, according to other examples, an optical gateway satellite 22 comprising a hybrid (both optical and radio) gateway module 12 from being used. In such a case, if an optical link cannot be established over the feeder link of the optical gateway satellite 22 (part b) in FIG. 3), the data from the user terminal 21 can thus be exchanged with the radio gateway station 24 via the radiofrequency-only gateway satellite 25 and/or via the optical gateway satellite 22.

Moreover, in the example shown in FIG. 3, the user module 11 of the optical gateway satellite 22 could also be replaced with an inter-satellite communication module, preferably of an optical kind, suitable for exchanging data over an inter-satellite link with the radiofrequency-only gateway satellite 25. In such a case, if an optical path exists between the optical gateway satellite 22 and the optical gateway station 23, the user terminal 21 preferably exchanges data with the optical gateway station 23, via the radiofrequency-only gateway satellite 25 and the optical gateway satellite 22, which exchange data with one another over the inter-satellite link.

In the examples shown in FIGS. 2 and 3, the satellite telecommunications system 20 comprises a user terminal 21, an optical gateway satellite 22, an optical gateway station 23, a radio gateway station 24 and, in FIG. 3, a radiofrequency-only gateway satellite 25. It goes without saying that the satellite telecommunications system 20 can comprise, in other examples, a plurality of user terminals 21 and/or a plurality of radio gateway stations 24 and/or a plurality of optical gateway stations 23 and/or a plurality of optical gateway satellites 22 and/or a plurality of radiofrequency-only gateway satellites 25.

According to preferred embodiments, the satellite telecommunications system 20 comprises at least two remote optical gateway stations 23 arranged such that they allow the simultaneous existence of optical paths between the optical gateway satellite 22 and each of the plurality of optical gateway stations 23. In such embodiments, the probability of being able to establish an optical link over the feeder link of the optical gateway satellite 22 is improved. More specifically, even with the presence of clouds between the optical gateway satellite 22 and an optical gateway station 23, an optical path can exist between said optical gateway satellite 22 and another optical gateway station 23. Such arrangements allow the availability of the optical link over the feeder link to be improved. Preferably, the optical gateway stations are separated by a sufficient distance (for example greater than 50 km, or even greater than 100 km) to ensure the de-correlation of meteorological phenomena.

It should be noted that, when the satellite telecommunications system 20 comprises a plurality of optical gateway stations 23, said stations are not necessarily all simultaneously active. For example, one of the optical gateway stations 23 could be activated solely to replace another optical gateway station 23, when said other optical gateway station 23 has malfunctioned or is masked by clouds. An optical gateway station 23 that is not active thus does not increase the maximum capacity of the satellite telecommunications system 20, since it is only used to replace another optical gateway station 23, however improves the average capacity by improving the availability of an optical link over the feeder link.

In order to procure a maximum optical capacity $C_{OPT}$ at the satellite telecommunications system 20, the deployment of a plurality (generally between two and five) of active optical gateway stations 23 having a low capacity (and thus a low cost), i.e. each procuring a capacity of less than $C_{OPT}$ is advantageous, rather than deploying a single optical gateway station 23 with a high capacity (and thus a high cost), procuring the capacity $C_{OPT}$ alone.

Such a plurality of optical gateway stations 23 is, for example, grouped together into a network, which can be operated either by the operator owning the satellites or by another entity allowing access to the network thereof, similar to providing a service for example.

The physical separation of the optical gateway stations 23 allow the average optical capacity to be significantly increased. More specifically, the availability of an optical link over the feeder link is improved since the probability that, at a given moment in time, no optical link is available is much lower than in the case whereby the satellite telecommunications system 20 only comprises a single, high-capacity optical gateway station 23. In order to improve the average optical capacity and the availability of an optical link, two high-capacity optical gateway stations 23 can be provided, only one of which is active at all times. However, it is generally more cost-effective to deploy a plurality of active, low-capacity optical gateway stations 23 rather than two high-capacity optical gateway stations, only one of which is active. Moreover, the deployment of a plurality of low-capacity optical gateway stations 23 can take place more gradually, in order to spread the investment over time as the demand for capacity evolves.

FIG. 4 diagrammatically illustrates one preferred embodiment of a satellite telecommunications system 20, comprising a plurality of radiofrequency-only gateway satellites 25 and a plurality of optical gateway satellites 22 in low-Earth orbit.

Preferably, the optical gateway satellites 22 are stationed, in a plane of the constellation, such that there are always one or more radiofrequency-only gateway satellites 25 inserted between two optical gateway satellites 22. From an operational perspective, an operator can, for example, firstly deploy a constellation of radiofrequency-only gateway satellites 25. Then, in order to increase the capacity of its satellite telecommunications system, the operator can launch optical gateway satellites 22, inserted between the former radiofrequency-only gateway satellites 25.

In the non-limiting example shown in FIG. 4, the satellite telecommunications system 20 further comprises a plurality of radio gateway stations 24 and a plurality of optical gateway stations 23. It should be noted that the optical gateway stations 23 are separate from one another. However, an optical gateway station 23 can, in the satellite telecommunications system 20, be combined with a radio gateway station 24. The optical gateway stations 23 are preferably situated in geographical areas where the density of data traffic is at its highest (in order to increase capacity) and/or where the availability of the optical link is at its greatest (for example in dry geographical areas or bordering wet geographical areas).

For example, the data exchanges with the user terminals 21 exclusively take place in the form of radio-frequency signals. In a non-limiting example:

the data exchanges over the user links of the radiofrequency-only gateway satellites 25 take place in the Ka-band, the data exchanges over the feeder links of the radiofrequency-only gateway satellites 25 take place in the Q-band (uplink) and in the V-band (downlink), the data exchanges over the user links of the optical gateway satellites 22 take place in the Q-band (uplink) and in the V-band (downlink).

However, this does not prevent, according to other examples, the consideration of other radio-frequency bands. In particular, the same radio-frequency band or bands can be used over the user links of the radiofrequency-only gateway satellites 25 as well as of the optical gateway satellites, for example the Ka-band.

A user terminal 21 can exchange data simultaneously with one or two satellites, thus via one or two user links. This data can originate from a plurality of radiofrequency-only gateway stations, a plurality of optical-only gateway stations, or both types at the same time. In a similar manner, the same beam can contain user terminals 21 which exchange data with radiofrequency-only gateway stations, with optical-only gateway stations, or with both types at the same time.

In the non-limiting example shown in FIG. 4, the satellite telecommunications system 20 comprises both at least one optical gateway satellite 22, the gateway module 12 whereof is optical-only (left-hand part of FIG. 4), and at least one optical gateway satellite 22, the gateway module 12 whereof is hybrid, i.e. both optical and radio (right-hand part of FIG. 4). However, this does not prevent, according to other examples, the use of a satellite telecommunications system 20 of which the one or more optical gateway satellites 22 all comprise a radiofrequency-only gateway module 12, or of which the one or more optical gateway satellites 22 all comprise a hybrid gateway module 12.

According to specific embodiments, the satellite telecommunications system 20 further comprises a control module (not shown in the figures) for controlling said satellite telecommunications system 20. In particular, the control module determines whether the data from one or more user terminals 21 must be exchanged with a radio gateway station 24 or with an optical gateway station 23, and routes said data accordingly, to said radio gateway station 24 or to said optical gateway station 23.

The control module comprises, for example, one or more processors and storage means (magnetic hard drive, electronic memory, optical disc, etc.) in which a computer program product is stored, in the form of a set of program code instructions to be executed. Alternatively or additionally, the control module comprises one or more programmable logic devices (FPGA, PLD, etc.), and/or one or more application-specific integrated circuits (ASIC, etc.), and/or a set of discrete electronic components, etc.

In other words, the control module comprises a set of means designed through the software (specific computer program product) and/or hardware (FPGA, PLD, ASIC, discrete electronic components, etc.) thereof to control the satellite telecommunications system 20.

The control module is, for example, fully integrated into one of the pieces of equipment of the satellite telecommunications system 20, or is distributed over a plurality of said equipment. For example, in the case shown in FIG. 2, the control module can be fully integrated into the optical gateway satellite 22.

According to preferred embodiments, the control module is integrated into a ground station, and controls, for example remotely, different pieces of equipment of the satellite telecommunications system 20, in particular in order to route the data from the user terminals 21 to a radio gateway station 24 and/or to an optical gateway station 23.

FIG. 5 diagrammatically illustrates the main steps of a method 50 for controlling a satellite telecommunications system 20, implemented by the control module. As shown in FIG. 5, when a plurality of user terminals 21 are suitable for exchanging data with an optical gateway satellite 22 and with a radiofrequency-only gateway satellite 25, said control method 50 comprises the steps of:

determining 51 whether an optical path exists between the optical gateway satellite 22 and an optical gateway station 23, in the absence of an optical path (denoted by the reference numeral 510 in FIG. 5): routing 52 the data from the user terminals 21 to a radio gateway station 24, in the presence of an optical path (denoted by the reference numeral 511 in FIG. 5): routing 53 at least one portion of the data from the user terminals to the optical gateway station 23.

In step 51, the presence or absence of an optical path between the optical gateway satellite 22 and an optical gateway station 23 is determined.

For example, an attempt can be made to establish an optical link between the optical gateway satellite 22 and an optical gateway station 23. If the establishment of the optical link fails, this means that an optical path does not exist. If the establishment of the optical link is successful, this means that an optical path does exist.

It should be noted that step 51 does not necessarily seek to determine whether a path exists at the present time, but conversely may seek to determine whether an optical path is capable of existing at a later time, in order to prepare for the routing of the data from the user terminals 21. For example, weather forecasts can be taken into consideration in order to determine whether, at a later time, the optical path is likely to be obstructed by clouds, preventing the optical link from being established. This is particularly useful, in particular in the case of satellites in LEO, in order to determine whether an optical link can be established when the optical gateway satellite 22 passes over a given geographical area. In the case of a satellite telecommunications system 20 comprising a plurality of optical gateway satellites 22 in LEO, in order to determine whether an optical link can be established when a given optical gateway satellite 22 passes over a given geographical area at a later time, information collected for another optical gateway satellite 22 that has just passed or that is about to pass over said geographical area can be used. Moreover, the obstruction of the optical path can inform the satellite telecommunications system 20 on the meteorological phenomena capable of partially deteriorating the radio link over the user links or over the feeder link with the radio gateway station 24. The satellite telecommunications system 20 can use data rate adaptation techniques known to a person skilled in the art (adaptation of coding level, modulation type and/or symbol rate) in order to guarantee data exchange, despite the more difficult propagation conditions.

If no optical path exists (denoted by the reference numeral 510 in FIG. 5), the data from the user terminals is routed to a radio gateway station 24. If an optical path does exist (denoted by the reference numeral 511 in FIG. 5), the data from the user terminals 21 can be routed to an optical gateway station and/or to a radio gateway station 24. The decision to route the data from a user terminal 21 to the optical gateway station 23 and/or to the radio gateway station 24 can take into account at least one parameter from the following group of parameters:

a data rate required for each user terminal 21,
a quality of service level required for each user terminal,
a type of application used by each user terminal,
a number of user terminals to be fed per beam, etc.

In the case of a satellite telecommunications system 20 as shown in FIG. 3, i.e. comprising at least one radiofrequency-only gateway satellite 25, when no optical path exists (denoted by the reference numeral 510 in FIG. 5), the routing step 52 entails, for example, routing the data from the user terminals 21 to a radiofrequency-only gateway satellite 25 (in particular if the optical gateway satellite 22 does not have any hybrid user module 11). If an optical path exists (denoted by the reference numeral 511 in FIG. 5), the routing step 53 entails distributing the user terminals 21 between the radiofrequency-only gateway satellite 25 and the optical gateway satellite 22. The distribution can consist, for example, in routing the data from all user terminals 21 to the optical gateway satellite 22.

According to preferred embodiments, the control method 50 comprises, alternatively or additionally to the embodiments described hereinabove, the step of controlling the data rate from each user terminal 21 as a function of the existence or absence of an optical path between the optical gateway satellite 22 and an optical gateway station 23. For example, the data rate from all or part of the user terminals 21 can be increased in the presence of an optical path, compared to cases wherein no optical path exists between the optical gateway satellite 22 and an optical gateway station 23, in order to account for the capacity over the feeder link (optical or radio link). Furthermore, the data rate from all or part of the user terminals 21 can be reduced in the absence of any optical path in order to account for the meteorological interference over the feeder link, which is also capable of reducing the quality of the radio link over said feeder link.

As stated hereinabove, the capacity of an existing satellite telecommunications system comprising only one or a plurality of radiofrequency-only gateway satellites 25 can be increased. The increase in capacity of a satellite telecommunications system is described hereinbelow as regards the spatial component thereof (stationing of optical gateway satellites 22) and as regards the terrestrial component thereof (deployment of optical gateway stations 23).

For this purpose, the stationing of at least one optical gateway satellite 22 (i.e. comprising an optical-only or hybrid (optical/radio) gateway module 12) in an Earth orbit is sufficient to complete the constellation of said existing satellite telecommunications system, as well as the addition of at least one optical gateway station 23.

In the case wherein the stationed optical gateway satellite 22 comprises a hybrid (optical/radio) gateway module 12, said optical gateway satellite 22 can be used even when no optical gateway station 23 has yet been deployed, by using the radio link over the feeder link. In such a case, the increase in capacity over the feeder link is only obtained when at least one optical gateway station 23 has been deployed.

It should be noted that the optical link over the feeder link is only used when an optical path exists. If no optical path exists, the satellite telecommunications system operates as it did before the stationing of said optical gateway satellite 22, by means of a radio gateway station 24. The satellite telecommunications system having an increased capacity can thus operate with a single optical gateway station 23, and the addition of additional optical gateway stations 23 thus only serves to improve the maximum capacity and/or the average capacity of the satellite telecommunications system 20.

By denoting the maximum capacity provided by the satellite telecommunications system 20 as $C_{MAX}$, said maximum capacity will increase progressively with the gradual deployments of the active optical gateway stations 23 on the ground.

Before having undergone any increase in capacity, the satellite telecommunications system comprises one or more radio gateway stations 24 providing a maximum radio capacity $C_{RF}$, and the maximum capacity $C_{MAX}$ is equal to the maximum radio capacity $C_{RF}$ ($C_{MAX}=C_{RF}$).

If the operator is looking to increase the maximum capacity of the satellite telecommunications system, one or more active optical gateway stations 23 can be deployed, jointly providing a maximum optical capacity $C_{OPT}$. The maximum capacity $C_{MAX}$ of the satellite telecommunications system 20 is thus increased: $C_{MAX}=C_{RF}+C_{OPT}$.

By way of example, after the full deployment of all gateway stations, the following distribution can be targeted: $C_{RF}=\frac{1}{5} \times C_{MAX}$ and $C_{OPT}=\frac{4}{5} \times C_{MAX}$. The maximum optical capacity must be distributed between all active optical gateway stations 23 deployed. A single active, high-capacity optical gateway station 23 can be deployed, itself alone providing a capacity of $\frac{4}{5} \times C_{MAX}$ or, for example, four active, low-capacity optical gateway stations 23 can be deployed, each of which only provides a capacity of $\frac{1}{5} \times C_{MAX}$, yet improving the availability of an optical link over the feeder link, and thus the average optical capacity of the satellite telecommunications system 20. The capacity of each of the low-capacity optical gateway stations 23 can also be slightly oversized, each of which providing a capacity that slightly exceeds $\frac{1}{5} \times C_{MAX}$, in order to improve the average optical capacity.

Generally speaking, it should be noted that the embodiments considered above have been described by way of non-limiting examples, and that other alternative embodiments can thus be envisaged.

In particular, the invention described hereinabove can be used in any radio-frequency band; mention can be made, by way of example, of the radio-frequency bands conventionally used by satellite telecommunications systems, such as: C, L, S, X, Ku, Ka, Q/V. The invention can furthermore be used in any optical frequency band and is not limited to a specific type of Earth orbit.

The description provided hereinabove clearly shows that, via its different features and the advantages thereof, the present invention achieves the objectives set therefor. In particular, the present invention can procure, over the feeder link of the satellite telecommunications system, a greater availability of the radio link and a higher capacity of the optical link, when said optical link is available.

Moreover, according to the embodiments considered, the present invention allows for:

the use of an existing satellite telecommunications system as a basis in order to upgrade the capacity thereof at a low cost, by building on the pre-existing and operational spatial and ground infrastructures; this upgrade thus takes place in a context of operational continuity for the user terminals with a possible improvement of the services provided thereto and/or an increase in the system capacity supplied by the operator;

the temporary achievement of a very high capacity (potentially greater than 1 terabit/s) with a single optical gateway satellite having a hybrid gateway module 12, or with a single optical gateway satellite 22 and a single radiofrequency-only gateway satellite, for example in GEO;

the ground infrastructure that must be added by the operator to be limited (minimising the complexity of the gateway modules of the satellites, the number of gateway stations) by limiting the number of optical gateway stations, thanks to the routing of the data from the user terminals to the radio gateway stations 24 when the optical link is not available;

a gradual deployment of the capacity as a function of the use made thereof and according to the operator's desire to invest;

availability to be handled at system level and not at the level of a single feeder link, by incorporating the fact that the feeder link can be a radio link and/or an optical link; the rate variation perceived by the user terminals is interpreted as a variable contention ratio at the gateway stations;

the compatibility, in certain embodiments, with the existing user terminals;

the elimination of any need for the operator to submit a regulatory file in order to obtain administrative authorisation since the use of optical frequency bands does not require such authorisation;

in the case of satellites in LEO, the use of optical frequency bands has the advantage of not interfering with the existing radiofrequency links of the constellation and also of not interfering with the radiofrequency links of satellites in GEO, which is advantageous during the passage of satellites in LEO at the Equator.

The invention claimed is:

1. A satellite telecommunications system comprising at least one terrestrial user terminal, wherein said system comprises at least one so-called optical gateway satellite in Earth orbit, comprising a payload, said payload comprising:

a communication module, referred to as a user module, suitable for exchanging data with said terrestrial user terminal, a communication module, referred to as a gateway module, suitable for exchanging data in the form of optical signals with at least one terrestrial optical gateway station, the satellite telecommunications system further comprising:

at least one other so-called radiofrequency-only gateway satellite, comprising a communication module, referred to as a user module, suitable for exchanging data with said user terminal, and a communication module, referred to as a gateway module, suitable for exchanging data solely in the form of radio-frequency signals with at least one radio gateway station, a control module configured such that said control module determines whether an optical path exists between the optical gateway satellite and an optical gateway station and such that said control module routes the data from the user terminal to the radiofrequency-only gateway satellite in the absence of any optical path.

2. The system according to claim 1, comprising a plurality of user terminals suitable for exchanging data with the radiofrequency-only gateway satellite and with the optical gateway satellite, the control module being configured such that it distributes the user terminals between the radiofrequency-only gateway satellite and the optical gateway satellite in the case whereby an optical path exists between the optical gateway satellite and an optical gateway station.

3. The system according to claim 2, wherein the control module is configured such that it distributes said user terminals between the radiofrequency-only gateway satellite and the optical gateway satellite as a function of at least one parameter from the following group of parameters:

a data rate required for each user terminal,
a quality of service level required for each user terminal,
a type of application used by each user terminal,
a number of user terminals to be fed per beam.

4. The system according to claim 1, wherein the control module is configured such that it controls the data rate from each user terminal as a function of the existence or absence of an optical path between the optical gateway satellite and the optical gateway station.

5. The system according to claim 1, wherein the optical gateway satellite is in low Earth orbit.

6. The system according to claim 1, comprising at least two remote optical gateway stations arranged such that they allow the simultaneous existence of optical paths between the optical gateway satellite and each of the two optical gateway stations.

7. A method for controlling a satellite telecommunications system, said method comprising:

operating plural user terminals, each user terminal being a terrestrial user terminal;

having at least one optical gateway satellite in Earth orbit, said at least one optical gateway satellite comprising a payload, said payload comprising a first communication module, referred to as a user module, suitable for exchanging data with each said user terminal, and a second communication module suitable for exchanging data in the form of optical signals with at least one terrestrial optical gateway station;

operating at least one other so-called radiofrequency-only gateway satellite, comprising a third communication module, referred to as a user module, suitable for exchanging data with each said user terminal, and a fourth communication module suitable for exchanging data solely in the form of radio-frequency signals with at least one radio gateway station; and determining, using a control module, whether an optical path exists between the optical gateway satellite and an optical gateway station, wherein, the user terminals are suitable for exchanging data with the radiofrequency-only gateway satellite and with the optical gateway satellite, when no optical path exists between the optical gateway satellite and the optical gateway station, routing the data from the user terminals to the radiofrequency-only gateway satellite, and when an optical path exists between the optical gateway satellite and the optical gateway station, distributing the user terminals between the radiofrequency-only gateway satellite and the optical gateway satellite.

8. The method according to claim 7, wherein the distribution of the user terminals between the radiofrequency-only gateway satellite and the optical gateway satellite is determined as a function of at least one parameter from the following group of parameters:

a data rate required for each user terminal,
a quality of service level required for each user terminal,
a type of application used by each user terminal,
a number of user terminals to be fed per beam.

9. The method according to claim 7, comprising the step of controlling a data rate from each user terminal as a function of the existence or absence of an optical path between the optical gateway satellite and an optical gateway station.

10. A non-transitory program storage device, readable by a computer, tangibly embodying a program of instructions executable by the computer to perform the control method according to claim 7.

11. A method for increasing capacity of a satellite telecommunications system comprising at least one terrestrial user terminal and at least one satellite orbiting the Earth, referred to as a radiofrequency-only gateway satellite, comprising a communication module, referred to as a user module, suitable for exchanging data with said user terminal, and a communication module, referred to as a gateway module, suitable for exchanging data solely in the form of radio-frequency signals with at least one radio gateway station, wherein said method comprises:
- stationing at least one other so-called optical gateway satellite in Earth orbit, comprising a communication module, referred to as a user module, suitable for exchanging data with said user terminal, and a communication module, referred to as a gateway module, suitable for exchanging data in the form of optical signals with at least one terrestrial optical gateway station,
- after the stationing of the optical gateway satellite: controlling the satellite telecommunications system in accordance with a control method according to claim 7.

12. The method according to claim 11, comprising gradual deployment of optical gateway stations.

* * * * *